United States Patent [19]

Morrison

[11] Patent Number: 4,507,731
[45] Date of Patent: Mar. 26, 1985

[54] BIDIRECTIONAL DATA BYTE ALIGNER

[75] Inventor: Brian D. Morrison, Framingham, Mass.

[73] Assignee: Raytheon Company, Lexington, Mass.

[21] Appl. No.: 438,142

[22] Filed: Nov. 1, 1982

[51] Int. Cl.³ .............................................. G06F 1/00
[52] U.S. Cl. .................................................. 364/200
[58] Field of Search ........................ 364/200 MS File

[56] References Cited

U.S. PATENT DOCUMENTS

| | | | |
|---|---|---|---|
| 3,602,896 | 8/1971 | Zeheb | 364/200 |
| 4,020,470 | 4/1977 | Drimak et al. | 340/172.5 |
| 4,079,451 | 3/1978 | Woods et al. | 364/200 |
| 4,092,728 | 5/1978 | Baltzer | 364/900 |
| 4,099,253 | 7/1978 | Dooley, Jr. | 364/900 |
| 4,131,940 | 12/1978 | Moyer | 364/200 |
| 4,150,364 | 4/1979 | Baltzer | 340/703 |
| 4,156,905 | 5/1979 | Fassbender | 364/200 |

FOREIGN PATENT DOCUMENTS

| | | |
|---|---|---|
| 1178065 | 4/1967 | United Kingdom . |
| 1449229 | 9/1976 | United Kingdom . |
| 0032136 | 7/1981 | United Kingdom . |
| 0056008 | 7/1982 | United Kingdom . |

Primary Examiner—Raulfe B. Zache
Attorney, Agent, or Firm—Walter F. Dawson; Richard M. Sharkansky; Joseph D. Pannone

[57] ABSTRACT

A byte-addressable memory system having an array of transceivers with control logic which enables memory to be addressable on individual byte boundaries rather than on two byte (word) or four byte (longword) boundaries. The memory system has two independent even-address and odd-address segments allowing parallel access to two longwords (eight bytes or one quadword) simultaneously. Logic determines which of the eight bytes should be placed on a four byte bus and the sequential order of the bytes on the bus. The entire operation takes place in one memory cycles time period and can start at any byte address.

57 Claims, 4 Drawing Figures

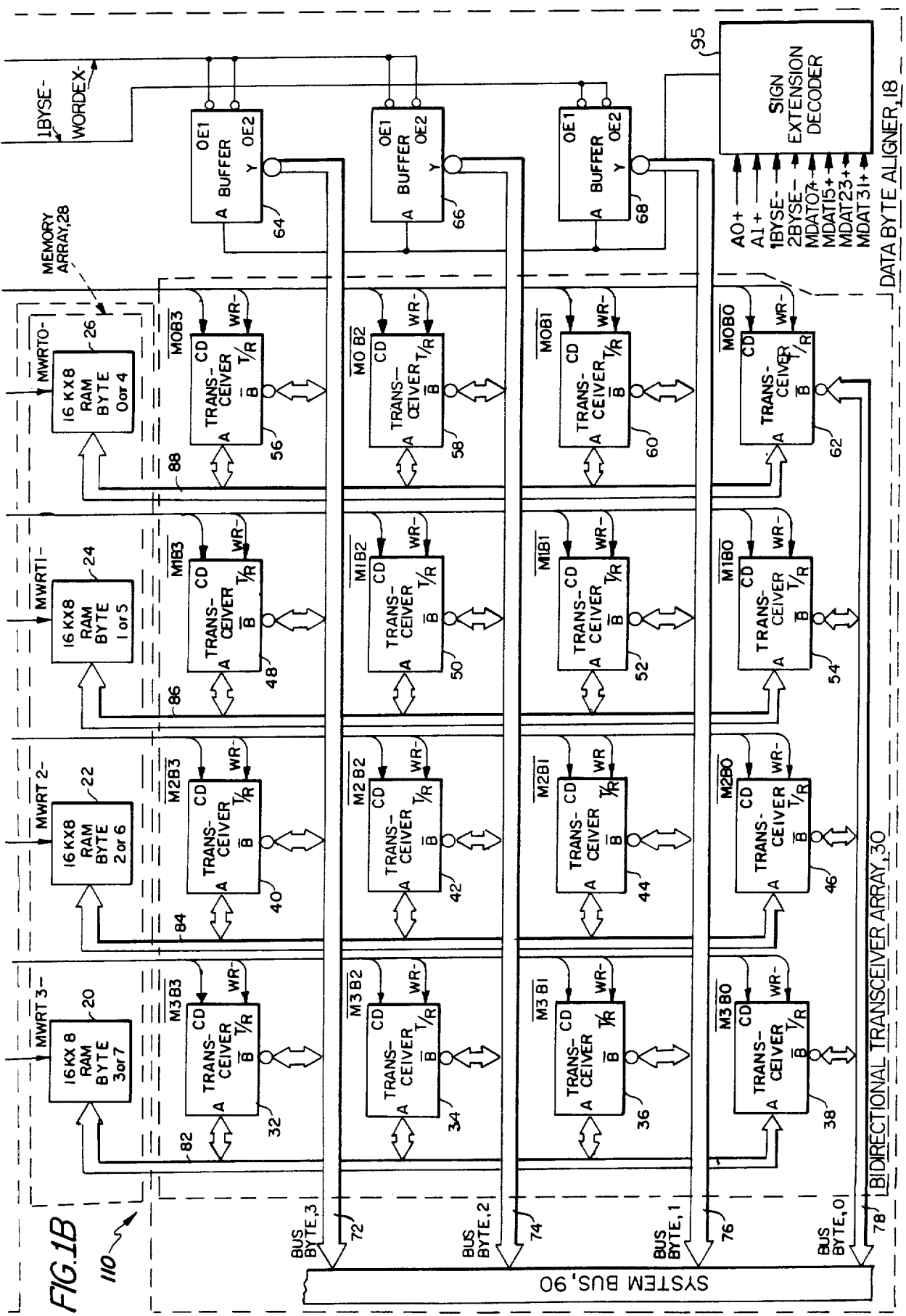

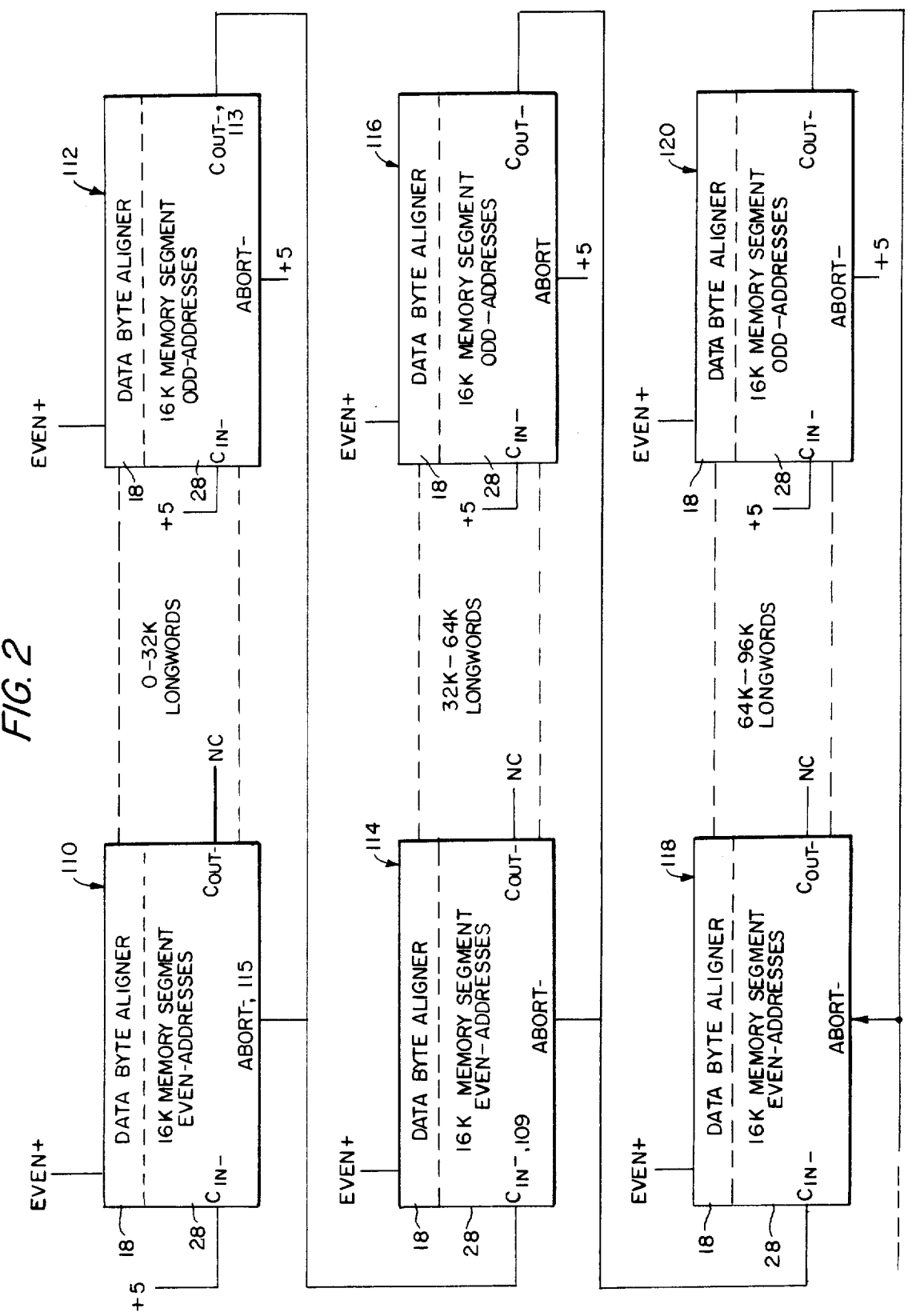

BIDIRECTIONAL DATA BYTE ALIGNER

BACKGROUND OF THE INVENTION

This invention relates to a random access memory and more particularly to a bidirectional data byte aligner apparatus for transferring one or more bytes of a digital word to and from one or more memory locations within one memory cycle time period.

A computer or data processing system usually comprises a memory subsystem having a plurality of memory locations for the storage of digital words made up of a specific number of bits such as 8, 16, 24 or 32. The computer architecture for some prominent 32 bit general register machines employs variable length instructions represented by a sequence of bytes with the first one or two bytes specifying the operation to be performed and subsequent bytes specifying the operands. The average instruction is approximately three bytes in length, although in one computer the instructions may be from one to fifty-six bytes long. Storage of a mixture of variable length instructions and data in a 32 bit longword memory achieves maximum utilization of the memory storage space available if, for example, part of a 32 bit instruction or data word is stored in the same memory address as a 16 bit instruction or data word and the remainder in a subsequent memory address.

In the prior art, efficient utilization of memory space has been accomplished by a combination of hardware and software techniques. Often, more than one memory cycle time period is required when part of an instruction or data word is stored at one memory address and the other part is stored at a subsequent memory address location. In other cases, only certain addresses of a memory system are available for storage of multiple byte words, or provision is made for converting an unaligned memory request into a sequence of shorter aligned requests, which requires several memory cycle time periods. The result has been that efficient utilization of memory space is accomplished, but the processing speed of the computer is reduced.

The prior art has placed restrictions upon byte addressability in a memory system resulting in improved memory utilization but decreased speed of operation. It is desirable to be able to access any sequence of one, two or four bytes beginning at any byte address in a memory system without any alignment constraints placed on the programmer or on the operating system in order to achieve maximum system performance with minimum hardware.

SUMMARY OF THE INVENTION

This invention discloses a bidirectional data byte aligner including a system bus for delivering digital bytes of information to a memory and receiving digital bytes of information from said memory, transceiver means for transferring at least one of a plurality of digital bytes between the memory and the system bus, a first byte bus for transferring at least one of the bytes between the system bus and a first port of the transceiver means, a second byte bus for transferring at least one of the bytes between a second port of the transceiver means and the memory, means for controlling writing and reading memory accesses starting at any byte location within the memory, and means for controlling the transceiver means when transferring at least one of the bytes between the memory and the system bus. The memory includes at least one even-address memory segment and at least one odd-address memory segment which are capable of being accessed simultaneously to provide memory access for a plurality of sequential bytes. The transceiver means comprises a plurality of bidirectional transceiver arrays and each array comprises a plurality of multiple bit bidirectional bus transceivers. The memory access controlling means further comprises means for writing and reading a plurality of bytes extending across the memory segment boundaries. The memory control and the transceiver control comprise a plurality of programmable logic arrays. In addition, there are means for performing right-justified zero-extension when transferring at least one of the bytes during a read memory cycle, and means for performing right-justified sign-extension when transferring at least one of the bytes during a read memory cycle.

The invention further discloses a memory for storing a plurality of digital bytes of information, which comprises at least one even-address memory segment and at least one odd-address memory segment, a byte aligner for accessing a byte of information at any one of a plurality of byte locations in the memory within one memory cycle and for accessing a plurality of sequential bytes starting at any byte location in the memory within one memory cycle, and a system bus for delivering said digital bytes to the memory and receiving said digital bytes from the memory. The even-address memory segment and the odd-address memory segment comprise means for being accessed simultaneously in one memory cycle time to provide access for a plurality of sequential bytes. Each of the memory segments comprises a byte aligner interconnected by the system bus. The memory accesses comprise read memory cycles and write memory cycles. The byte aligner also comprises a plurality of bidirectional transceiver arrays, each of said transceiver arrays further comprise a plurality of multiple bit bidirectional bus transceivers, and a plurality of programmed logic arrays. The programmed logic arrays comprise means for generating control signals for the memory and the bidirectional transceiver array.

The invention further discloses the method of accessing a memory having byte addressing capability comprising the steps of providing digital bytes of information to a system bus, transferring the bytes on a first byte bus between the system bus and a bidirectional transceiver means, performing byte alignment with said transceiver means, transferring the bytes on a second byte bus between the bidirectional transceiver means and the memory, controlling writing and reading cycles of the memory with programmed logic arrays and controlling the bidirectional transceiver means with said programmed logic arrays. The memory comprises at least one even-address memory array and at least one oddaddress memory array; the memory arrays are capable of being accessed simultaneously to provide memory access for a plurality of sequential bytes. The step of controlling the writing and reading cycles for the digital bytes comprises means for starting at any byte location within the memory and extending across the memory array boundaries. The bidirectional transceiver means comprises a plurality of bidirectional transceiver arrays and each of the arrays further comprises a plurality of multiple bit bidirectional bus transceivers.

BRIEF DESCRIPTION OF THE DRAWINGS

Other and further features and advantages of the invention will become apparent in connection with the accompanying drawings wherein:

FIGS. 1A and 1B together are a functional block diagram of the bidirectional data byte aligner invention coupled to a 16K longword by 32 bit RAM;

FIG. 2 is a block diagram of a memory system organized into independent even-address and odd-address segments, each segment comprising the invention shown in FIGS. 1A and 1B.

DESCRIPTION OF THE PREFERRED EMBODIMENT

Figure 1A:
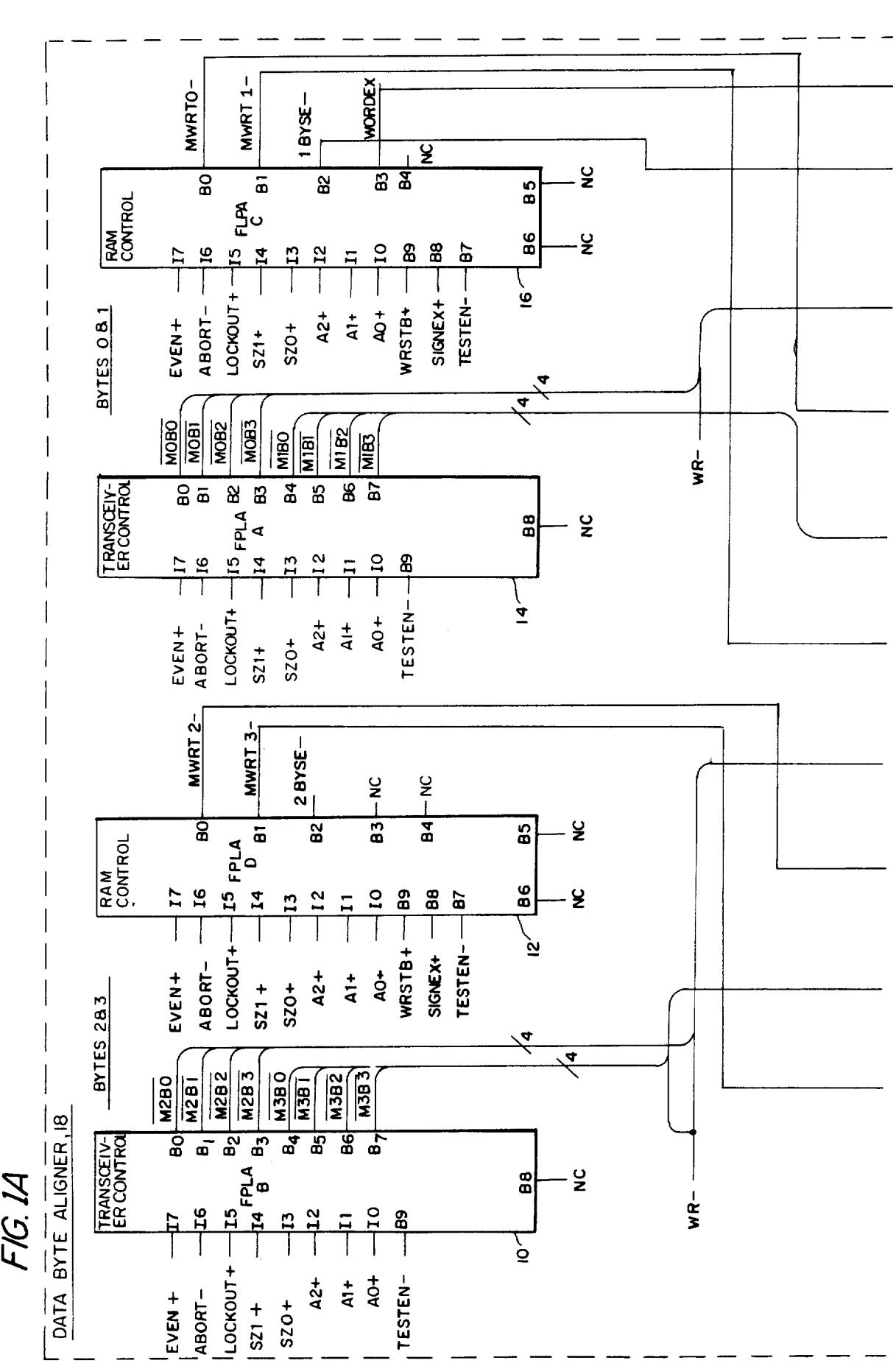

Referring now to FIG. 1A and FIG. 1B there is shown a block diagram of a 16K longword by 32 bit memory segment 110 comprising a bidirectional data byte aligner 18 connected to a 16K longword by 32 bit memory array 28. The data byte aligner 18 enables a memory to be addressable on individual byte boundaries rather than on two byte (word) or four byte (longword) boundaries, with a byte comprising 8 bits. The memory segment 110 when interconnected to another memory segment 112, as indicated in FIG. 2, forms a 32K longword by 32 bit word organized, byte addressable, random access, memory system. Memory segment 110 comprises even longword aligned addresses and memory segment 112 comprises odd longword aligned addresses. Both memory segments 110 and 112 operate in parallel by performing a two longword memory access producing 8 bytes (quadword) in order to speed up memory accesses to bytes which are not aligned on memory word boundaries. When a memory longword address is an even base address, an even-address memory segment location (n) is accessed and supplies four bytes (0-3); at the same time an odd-address memory segment location (n+1) is accessed and supplies an additional four bytes (4-7). When the base address is odd, the odd-address memory segment accesses a location (n) providing four bytes (0-3) and simultaneously the even-address memory segment accesses location (n+1) providing an additional four bytes (4-7). The data byte aligner 18 of each memory segment selects a maximum of four of the eight bytes for placement on a system bus 90 during a read memory cycle.

As shown in FIG. 2, additional pairs of memory segments may be added to memory segments 110 and 112 for increased memory storage capacity. When a memory access requires crossing a 32K longword (or 128K byte) memory segment pair boundary, a fast carry look-ahead circuit known to one skilled in the art in a memory segment 112 generates a carry-out signal COUT- 113 to the $C_{IN^-}$ 109 signal input of the next higher address in memory segment 114. When the base address is even, no carry-out will be generated since four consecutive bytes may be accessed without crossing the memory segment pair boundary. When the base address is odd and it is the highest address in a 32K longword memory segment pair address field, the COUT- 113 signal is generated to initiate a memory cycle in the next higher memory segment and to inhibit the lower even-address memory segment from responding by connecting the COUT- 113 signal to an ABORT- 115 input of the even-address memory segment 110, thereby prohibiting a bus conflict.

The data byte aligner 18 in a memory segment 110, as shown in FIGS. 1A and 1B comprises field programmable logic arrays (FPLAs) 10, 12, 14 and 16, and a bi-directional transceiver array 30 coupled to a memory array 28 and a system bus 90. The transceiver array 30 performs the bi-directional multiplexing functions and bidirectional bus interfacing under the control of the four FPLAs 10, 12, 14 and, 16. The memory array 28 provides storage for 16K longwords by 32 bits (4 bytes). The data byte aligner 18 is responsible for performing read or write cycles on memory array 28 and for selecting which of the eight accessed bytes (from two memory arrays) will be utilized. Each memory segment 110 and 112 comprises its own data byte aligner 18 circuits with each data byte aligner response being determined by the external EVEN+ strapping input to FPLAs 10-16. The data byte aligner may select one, two or four bytes for both read and write cycles and it is capable of handling data in either right-justified zero-extended or right-justified sign-extended forms. The same circuitry of the data byte aligner 18 is used to perform both read and write memory cycles, which is an important advantage of this invention.

Referring to FIG. 1B, the memory array 28 is organized into four RAMs 20, 22, 24 and 26 byte sections with each section comprising 16K words by 8 bits. The four sections together provide storage for 16K longwords by 32 bits. A 16K×1 bit static RAM is used to implement the memory array 28 such as an INMOS IMS1400 integrated circuit. Each 8 bit byte section of the memory array 28 is connected to the transceiver array 30 by individual RAM byte buses 82, 84, 86 and 88 which permit any byte to be transferred to and from any particular byte position on the system bus 90 via the bi-directional transceiver array 30.

Referring to FIG. 1A and FIG. 1B, the bi-directional transceiver array 30 comprises sixteen separately controlled octal transceivers 32-62 for transferring bytes of information between the system bus 90 and memory array 28. Each transceiver is an eight-bit bidirectional three-state integrated circuit which may be embodied with an AM73/8303 integrated circuit manufactured by Advanced Micro Devices. A T/R input on each transceiver determines the direction of logic signals through the transceiver, that is, whether the A port or the $\overline{B}$ port is the input or the output. A WR— signal is connected to the T/R input on all transceivers 32-62. A CD input is the chip disable input which functions as a chip select control input. FPLAs 10 and 14 generate sixteen control signals for selecting each one of the sixteen transceivers 32-62 individually. Three buffers 64, 66 and 68 along with a sign extension decoder 95 are used for zero or sign extension purposes when selecting only one or two bytes in a memory segment 110. The buffers 64, 66 and 68 may be embodied by Fairchild F244 integrated circuits. Byte buses 72, 74, 76 and 78 provide the data paths between the system bus 90 and the $\overline{B}$ terminals of transceivers 32-62. Byte buses 72, 74 and 76 connect also to buffers 64, 66 and 68 respectively. Byte buses 82, 84, 86 and 88 provide the data paths between the A terminals of transceivers 32-62 and RAMs 20, 22, 24 and 26.

Still referring to FIGS. 1A and 1B, the FPLAs 10, 12, 14 and 16 provide the control for the memory array 28 and transceiver array 30. In order to have identical hardware for each memory segment 110-120, as shown in FIG. 2, each FPLA 10-16 is coded to include the logic required to enable a memory segment to function both for even-addresses and for odd-addresses. Use of FPLAs provides a maximum function density for the required control logic. The determination of whether a memory segment 110–120 functions for even or odd-addresses is made by the EVEN+ signal connected to the I7 input of each FPLA 10–16. When EVEN+ is high, an FPLA functions for even-addresses and when EVEN+ is low, an FPLA functions for odd-addresses. An ABORT- signal of each FPLA 10–16 as previously discussed inhibits a lower even-address memory segment when a next higher even-address memory segment is being accessed. A LOCKOUT- signal is also connected to the I5 input of each FPLA 10–16 which acts as an enable so that output control signals will not switch state during input address bit changes. In addition, a TESTENsignal connected to an input of each FPLA 10–16 provides a test capability for each FPLA. The FPLAs 10–16 may be embodied by Signetics 82S153 tri-state integrated fuse logic comprising 32 AND gates and 10 OR gates with fusible link connections for programming I/O polarity and direction by means of standard logic programming equipment. Tables 1–4 provide the detail programming information for each of the four FPLAs 10, 12, 14 and 16 in a format prescribed by the data specifications for an 82S153 device.

Referring to Tables 1–4, the inputs are labeled I and the outputs are labeled B (although B terminals may also be used as inputs). For the inputs, an H indicates a high logic level and an L indicates a low logic level; a dash (—) indicates a "don't care" condition. For the outputs, an A indicates an active output and a dot (•) indicates an inactive output. The D rows represent ten direction control gates. When a D row contains O's, a B terminal is being used as an input. A dash (—) in a D row indicates that an output is enabled for all conditions. Further information regarding an FPLA may be obtained from the specification sheets for the tri-state FPLA 82S153 manufactured by Signetics. The logic required for control purposes is partitioned to minimize the number of devices and FPLA coding is minimized by using Quine-McCluskey techniques as described in Digital Circuits and Logic Design by Samuel C. Lee, Prentice Hall 1976.

Tables 1 and 2 provide the control program for the transceiver array 30, and as shown in FIG. 1A and FIG. 1B the outputs from the transceiver control FPLA 10 and 14 connect to transceivers 32–62 and control the transfer of data bytes between system bus 90 and RAMs 20–26. For example, an output signal such as M0B3 from transceiver control FPLA 14 functions as a transceiver enable and when the WR— write control signal is present determines that an eight bit byte from RAM 26 (referred to as M0 in Table 6) shall be transferred to byte bus 3 72 (also referred to as B3 in Tables 6 and 7) via transceiver 56. The remaining output signals of transceiver control FPLA 10 and 14 perform analogous functions for separately enabling each octal transceiver. Tables 3 and 4 provide the control program for generating the write control signals MWRT0—, MWRT1—, MWRT2—, and MWRT3— for the RAMs 26, 24, 22 and 20 respectively, which are generated by RAM control FPLA 12 and 16; in addition, FPLA 12 and 16 generate a one byte sign extend (1BYSE—) and a two byte sign extend (2BYSE—) control signals. The 1BYSE— signal from FPLA 16 connects to the sign extension decoder 95 and to the inputs of buffer 68. The 2BYSE— signal from FPLA 12 also connects to the sign extension decoder 95. FPLA 16 also generates the WORDEX— signal that connects to the sign extension buffers 64 and 66.

During a read cycle, the data byte aligner 18 presents the requested number of bytes to the system bus 90 as a function of size control field signals SZ1+ and SZ0+, address signals A1+ and A0+ and sign extension control signal SIGNEX+, at the inputs of FPLAs 10–16 as shown in FIG. 1A. The size control field specifies whether 1, 2 or 4 bytes of information are being accessed as indicated in Table 5.

TABLE 5

| Size Control Field | | |
|---|---|---|
| SZ1 | SZ0 | Requested Number of Bytes |
| 0 | 0 | 0 |
| 0 | 1 | 1 |
| 1 | 0 | 2 |
| 1 | 1 | 4 |

The two least significant bits (LSB) of a memory address represented by A1 and A0 in Table 6 specify which byte within an accessed longword is the initial byte. If the data identified by the size and address field resides exclusively in an even or odd memory segment, only that segment will output data on the system bus 90. If the data requested is located partly in an even-address memory segment and partly in an odd-address memory segment, then the appropriate bytes from both the even and the odd memory segments will be transferred to the system bus 90. When a memory access begins with an odd-address memory segment, the address to an even-address memory segment is automatically incremented before data alignment occurs. Therefore, sequential data bytes are always assured. When sign extension is specified during a read cycle as indicated by the presence of the SIGNEX+ signal at the B8 inputs of FPLA 12 and 16, it is gated with address and size control signals generating the 1BYSE— or 2BYSE— signals depending on whether a one or two byte memory access is requested. The most significant bit (MSB) of a most significant requested byte, for example MDAT07+, MDAT15+, MDAT23+ or MDAT31+ from the output of memory array 28, is examined by the sign extension decoder 95 and its output connects to sign extension buffers 64, 66, 68. Based upon the state of the MSB of the most significant byte of the word being accessed either all zeros or all ones are filled to the left of the accessed bytes on the system bus 90 thereby placing the sign information into the MSB position of an information word. When sign extension is not requested by the absence of SIGNEX+ signal at FPLA 12 and 16, all zeros are filled to the left of the accessed bytes placed on the system bus 90. Sign extension is not a valid operation during a memory write cycle.

Figure 3:
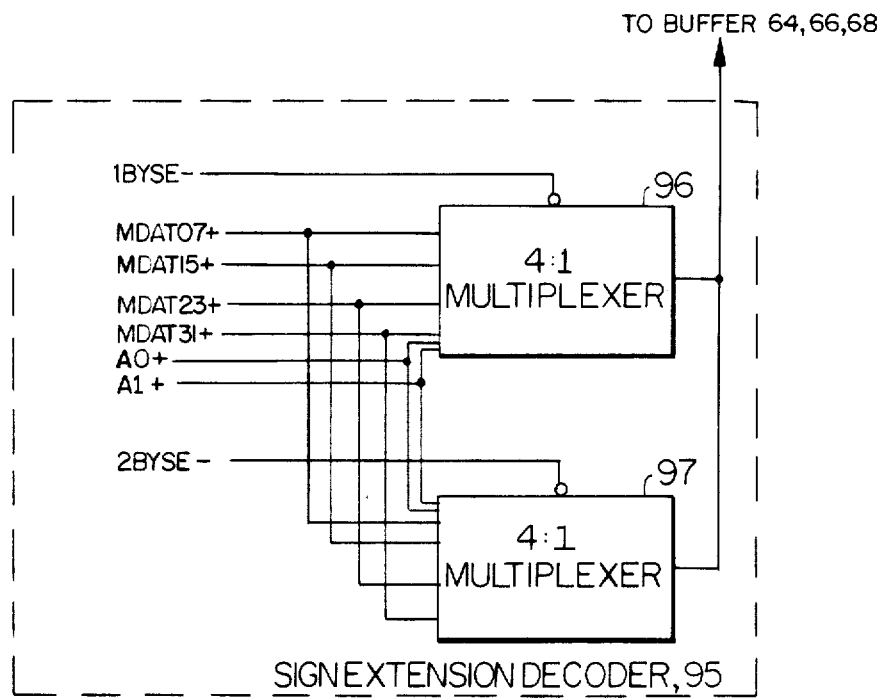
FIG. 3 is a more detailed functional block diagram of the sign extension decoder shown in FIG. 1B.

FIG. 3 shows a preferred embodiment of the sign extension decoder 95. A 4:1 multiplexer 96 selected by the 1BYSE— signal handles all one byte sign extensions and another 4:1 multiplexer 97 selected by the 2BYSE— signal handles all two byte sign extensions. The 4:1 multiplexers 96 and 97, which may be embodied with an F253 dual 4:1 multiplexer integrated circuit manufactured by Fairchild, select the proper memory data bit for use in the sign extension process. They use the two least significant memory address bits A1 and A0 to determine which byte in a longword is currently the base address. In the case of a one byte memory access, the bit to be used for sign extension is the most significant bit of the specific byte being accessed. Therefore, the one byte multiplexer 96 is connected to data bits 7, 15, 23 and 31 of the RAM memory array 28 represented by MDAT07+, MDAT15+, MDAT23 and MDAT31+ signals respectively. A base address of byte 0 causes multiplexer 96 to gate the MDAT07+ signal onto its output; similarly, a base address of byte 1 causes multiplexer 96 to gate the MDAT15+ signal onto its output. Likewise, a base address of byte 2 causes multiplexer 96 to gate the MDAT23+ signal onto its output and a base address of byte 3 causes multiplexer 96 to gate the MDAT31+ signal onto its output. The 1BYSE− control signal is only active during a one byte operation and thus serves to disable multiplexer 96 during two or four byte memory access operations. This signal also deselects the even-address or odd-address memory segments' sign extension circuitry when that memory segment is not outputting data.

Still referring to FIG. 3, in the case of a two byte memory access the bit to be used for sign extension is the most significant bit of the most significant byte being accessed. Therefore, the two byte multiplexer 97 is connected to data bits 15, 23, 31, and 07 of a RAM memory array 28 represented by MDAT15+, MDAT23+, MDAT31+ and MDAT07+ signals respectively. A base address of byte 0 causes the multiplexer 97 to gate MDAT15+ onto its output, which corresponds to the memory access of bytes 0 and 1. Similarly, a base address of byte 1 causes the multiplexer 97 to gate MDAT23+ onto its output. Likewise, a base address of byte 2 causes the multiplexer 97 to gate MDAT31+ onto its output. The significant case for the two byte memory access is when the base address is for byte 3; in this case the multiplexer 97 gates MDAT07+ (from byte 4) onto its output, since this is the next byte accessed when the boundary is crossed from an even-address memory segment to an odd-address memory segment or vice-versa. Actually, the same memory segment will no longer be responding when going across a memory segment boundary; the decoding of which memory segment is to respond and which one is to output its sign extension data is handled within the FPLA's 12 and 16. The 2BYSE− signal is used to enable multiplexer 97 which insures that this multiplexer shall be inactive during one or four byte memory accesses.

In both the one byte or two byte memory access cases, the output from the sign extension decoder 95 comprising multiplexer 96 and 97 is a logic 1 or a logic 0 depending upon the logical state of the selected bit. This output becomes the data input to the buffers 64, 66 and 68 which actually drive the external system bus 90. For a one byte sign extension, both the 1BYSE− and WORDEX− signals will be active, thereby placing the sign extension data onto bits 08-31 of the system bus 90. In the two byte case, only the WORDEX− signal will be active and the sign extension data will only be outputted on bits 16-31 of the system bus 90.

Table 6 summarizes the data multiplexing performed during a read cycle. In addition to the address bits A1 and A0 which specify the initial byte within an accessed word, address bit A2 determines whether an even-address memory segment or an odd-address memory segment contains the initial byte. The number of bytes requested along with sign extension status are indicated to the left of the address bits. B3, B2, B1 and B0 refer to byte bus 3 72, byte bus 2 74, byte bus 1 76 and byte bus 0 78 which connect to the four byte system bus 90. M0 through M7 refer to the RAMs 26, 24, 22 and 20 bytes 0 through 3 in an even-address memory segment 110 and the corresponding RAM bytes 4 through 7 in an odd-address memory segment 112. S refers to the sign of the most significant accessed byte. Although a total of eight bytes may be accessed from even-address memory segment 110 and odd address memory segment 112, only four of the eight bytes from both memory segments are selected by the data byte aligner logic in each memory segment for transfer to the system bus 90 under the control of the bi-directional transceiver array 30 in each memory segment.

Still referring to Table 6 and considering the case where there is no sign extension, two bytes requested, even-address memory segment (A2=0), and the first byte is in RAM byte M3 (A1,A0=1,1) then Column B0 under Address N (Even Memory) shows that RAM byte M3 will be placed on byte bus 0 78 and transferred to system bus 90 byte B0; in addition, Column B1 under address N+1 (Odd Memory) shows that RAM byte M4 will be placed on byte bus 1 76 in an odd address memory segment and transferred to system bus 90 byte B1 with zeros extending to the left into bytes B2 and B3 of system bus 90.

During a write cycle, the even-address and odd-address memory segment accesses are under the control of the data byte aligner 18. The aligner examines the size control field bit shown in Table 5 and the LSBs of the address bits A0 and A1 shown in Table 7 and determines which bytes of the memory segment are to be written into. When a write cycle is performed on the specified bytes, the remaining bytes are not disturbed.

Table 7 summarizes the data multiplexing performed during a write cycle. M0 through M7 refer to RAMs 20-26 bytes 0 through 7 of an even-address memory segment 110 and an odd-address memory segment 112. B0 through B3 refer to bytes 0 through 3 of system bus 90. Considering the case where there are two bytes B0 and B1 to be written into memory and the initial byte (B0) is specified to be written into an even-address memory segment (A2=0) and into byte location M3 (A1,A0=1,1), then B1 is written into the M4 byte of an odd-address memory segment as indicated in Table 7. The WR− signal, as shown in FIG. 1A and FIG. 1B, is present during a write cycle causing the $\overline{B}$ port of any transceiver 32-62 to be the input port and the A port to be the output port and providing a path for data being transferred from system bus 90 to any or all bytes of memory array 28.

This concludes the description of the preferred embodiment. However, many modifications and alterations will be obvious to one of ordinary skill in the art without departing from the spirit and scope of the inventive concept. Therefore, it is intended that the scope of this invention be limited only by the appended claims.

TABLE 1

FPLA A PROGRAM
TRANSCEIVER CONTROL (BYTES 0 and 1)

```
                         INPUTS                                           OUTPUTS
                                                                     H  H  L  L  L  L  L  L  L  L
TERM  I7 I6 I5 I4 I3 I2 I1 I0 B9 B8 B7 B6 B5 B4 B3 B2 B1 B0          B9 B8 B7 B6 B5 B4 B3 B2 B1 B0
  0   H  H  H  H  H  H  L  H  —  —  —  —  —  —  —  —  —  —    =      .  .  A  .  .  .  .  A  .  .
  1   L  H  H  H  H  L  H  L  H  —  —  —  —  —  —  —  —  —    =      .  .  A  .  .  .  .  A  .  .
  2   H  H  H  H  H  H  H  H  —  —  —  —  —  —  —  —  —  —    =      .  .  A  .  A  .  .  .  .  .
  3   L  H  H  H  H  L  H  H  H  —  —  —  —  —  —  —  —  —    =      .  .  .  A  .  .  .  .  .  .
  4   —  H  H  —  —  —  —  L  —  —  —  —  —  —  —  —  —  —    =      .  .  .  A  .  .  .  .  .  .
  5   L  H  H  H  —  H  L  L  —  —  —  —  —  —  —  —  —  —    =      .  .  .  .  A  .  .  .  .  A
  6   H  H  H  H  —  L  L  L  —  —  —  —  —  —  —  —  —  —    =      .  .  .  .  A  .  .  .  .  A
  7   L  H  H  —  H  H  L  H  H  —  —  —  —  —  —  —  —  —    =      .  .  .  .  A  .  .  .  .  A
  8   H  H  H  H  —  H  L  L  H  —  —  —  —  —  —  —  —  —    =      .  .  .  .  .  A  .  .  .  .
  9   L  H  H  H  —  H  L  H  H  —  —  —  —  —  —  —  —  —    =      .  .  .  .  .  A  .  .  .  .
 10   H  H  H  H  —  L  L  H  H  —  —  —  —  —  —  —  —  —    =      .  .  .  .  .  A  .  .  .  .
 11   H  H  H  H  H  H  L  H  H  —  —  —  —  —  —  —  —  —    =      .  .  .  .  .  .  A  .  .  .
 12   L  H  H  H  H  L  L  H  H  —  —  —  —  —  —  —  —  —    =      .  .  .  .  .  .  A  .  .  .
 13   H  H  H  H  —  H  H  H  H  —  —  —  —  —  —  —  —  —    =      .  .  .  .  .  .  .  .  A  .
 14   L  H  H  H  —  L  H  H  H  —  —  —  —  —  —  —  —  —    =      .  .  .  .  .  .  .  .  A  .
 15   L  H  H  —  H  H  L  L  —  —  —  —  —  —  —  —  —  —    =      .  .  .  .  .  .  .  .  A  .
 16   H  H  H  —  H  L  L  L  —  —  —  —  —  —  —  —  —  —    =      .  .  .  .  .  .  .  .  .  A
 17   0  0  0  0  0  0  0  0  0  0  0  0  0  0  0  0  0  0    =      A  A  A  A  A  A  A  A  A  A
 18   0  0  0  0  0  0  0  0  0  0  0  0  0  0  0  0  0  0    =      A  A  A  A  A  A  A  A  A  A
 19   0  0  0  0  0  0  0  0  0  0  0  0  0  0  0  0  0  0    =      A  A  A  A  A  A  A  A  A  A
 20   0  0  0  0  0  0  0  0  0  0  0  0  0  0  0  0  0  0    =      A  A  A  A  A  A  A  A  A  A
 21   0  0  0  0  0  0  0  0  0  0  0  0  0  0  0  0  0  0    =      A  A  A  A  A  A  A  A  A  A
 22   0  0  0  0  0  0  0  0  0  0  0  0  0  0  0  0  0  0    =      A  A  A  A  A  A  A  A  A  A
 23   0  0  0  0  0  0  0  0  0  0  0  0  0  0  0  0  0  0    =      A  A  A  A  A  A  A  A  A  A
 24   0  0  0  0  0  0  0  0  0  0  0  0  0  0  0  0  0  0    =      A  A  A  A  A  A  A  A  A  A
 25   0  0  0  0  0  0  0  0  0  0  0  0  0  0  0  0  0  0    =      A  A  A  A  A  A  A  A  A  A
 26   0  0  0  0  0  0  0  0  0  0  0  0  0  0  0  0  0  0    =      A  A  A  A  A  A  A  A  A  A
 27   0  0  0  0  0  0  0  0  0  0  0  0  0  0  0  0  0  0    =      A  A  A  A  A  A  A  A  A  A
 28   0  0  0  0  0  0  0  0  0  0  0  0  0  0  0  0  0  0    =      A  A  A  A  A  A  A  A  A  A
 29   0  0  0  0  0  0  0  0  0  0  0  0  0  0  0  0  0  0    =      A  A  A  A  A  A  A  A  A  A
 30   0  0  0  0  0  0  0  0  0  0  0  0  0  0  0  0  0  0    =      A  A  A  A  A  A  A  A  A  A
 31   0  0  0  0  0  0  0  0  0  0  0  0  0  0  0  0  0  0    =      A  A  A  A  A  A  A  A  A  A
 D9   0  0  0  0  0  0  0  0  0  0  0  0  0  0  0  0  0  0    ==      |  |  |  |  |  |  |  |  |  |
 D8   0  0  0  0  0  0  0  0  0  0  0  0  0  0  0  0  0  0    ==  =   |  |  |  |  |  |  |  |  |
 D7   —  —  —  —  —  —  —  —  —  —  —  —  —  —  —  —  —  —    ==  = =    |  |  |  |  |  |  |  |
 D6   —  —  —  —  —  —  —  —  —  —  —  —  —  —  —  —  —  —    ==  = = =    |  |  |  |  |  |  |
 D5   —  —  —  —  —  —  —  —  —  —  —  —  —  —  —  —  —  —    ==  = = = =    |  |  |  |  |  |
 D4   —  —  —  —  —  —  —  —  —  —  —  —  —  —  —  —  —  —    ==  = = = = =    |  |  |  |  |
 D3   —  —  —  —  —  —  —  —  —  —  —  —  —  —  —  —  —  —    ==  = = = = = =    |  |  |  |
 D2   —  —  —  —  —  —  —  —  —  —  —  —  —  —  —  —  —  —    ==  = = = = = = =    |  |  |
 D1   —  —  —  —  —  —  —  —  —  —  —  —  —  —  —  —  —  —    ==  = = = = = = = =    |  |
 D0   —  —  —  —  —  —  —  —  —  —  —  —  —  —  —  —  —  —    ==  = = = = = = = = =    |
```

TABLE 2

FPLA B PROGRAM
TRANSCEIVER CONTROL (BYTES 3 and 4)

```
                         INPUTS                                           OUTPUTS
                                                                     H  H  L  L  L  L  L  L  L  L
TERM  I7 I6 I5 I4 I3 I2 I1 I0 B9 B8 B7 B6 B5 B4 B3 B2 B1 B0          B9 B8 B7 B6 B5 B4 B3 B2 B1 B0
  0   —  H  H  —  —  —  —  L  —  —  —  —  —  —  —  —  —  —    =      .  .  A  .  .  .  .  A  .  .
  1   L  H  H  H  H  H  L  L  —  —  —  —  —  —  —  —  —  —    =      .  .  A  .  .  .  .  A  .  .
  2   H  H  H  H  H  L  L  L  —  —  —  —  —  —  —  —  —  —    =      .  .  A  .  A  .  .  .  .  .
  3   L  H  H  H  H  L  H  H  —  —  —  —  —  —  —  —  —  —    =      .  .  .  A  .  .  .  .  .  .
  4   H  H  H  H  H  L  L  H  H  —  —  —  —  —  —  —  —  —    =      .  .  .  A  .  .  .  .  .  .
  5   L  H  H  H  —  H  L  H  H  —  —  —  —  —  —  —  —  —    =      .  .  .  .  A  .  .  .  .  A
  6   H  H  H  H  —  L  H  L  H  —  —  —  —  —  —  —  —  —    =      .  .  .  .  A  .  .  .  .  A
  7   L  H  H  —  H  H  H  H  H  —  —  —  —  —  —  —  —  —    =      .  .  .  .  A  .  .  .  .  .
  8   H  H  H  —  H  L  H  H  H  —  —  —  —  —  —  —  —  —    =      .  .  .  .  .  A  .  .  .  .
  9   L  H  H  H  —  H  H  H  H  —  —  —  —  —  —  —  —  —    =      .  .  .  .  .  A  .  .  .  .
 10   H  H  H  H  —  L  H  H  H  —  —  —  —  —  —  —  —  —    =      .  .  .  .  .  A  .  .  .  .
 11   H  H  H  H  H  H  H  H  —  —  —  —  —  —  —  —  —  —    =      .  .  .  .  .  .  A  .  .  .
 12   L  H  H  H  H  L  H  H  —  —  —  —  —  —  —  —  —  —    =      .  .  .  .  .  .  A  .  .  .
 13   L  H  H  H  —  H  L  H  H  —  —  —  —  —  —  —  —  —    =      .  .  .  .  .  .  .  .  A  .
 14   H  H  H  H  —  L  L  H  H  —  —  —  —  —  —  —  —  —    =      .  .  .  .  .  .  .  .  A  .
 15   L  H  H  —  H  H  H  L  —  —  —  —  —  —  —  —  —  —    =      .  .  .  .  .  .  .  .  .  A
 16   H  H  H  —  H  L  H  L  H  —  —  —  —  —  —  —  —  —    =      .  .  .  .  .  .  .  .  .  A
 17   0  0  0  0  0  0  0  0  0  0  0  0  0  0  0  0  0  0    =      A  A  A  A  A  A  A  A  A  A
 18   0  0  0  0  0  0  0  0  0  0  0  0  0  0  0  0  0  0    =      A  A  A  A  A  A  A  A  A  A
 19   0  0  0  0  0  0  0  0  0  0  0  0  0  0  0  0  0  0    =      A  A  A  A  A  A  A  A  A  A
 20   0  0  0  0  0  0  0  0  0  0  0  0  0  0  0  0  0  0    =      A  A  A  A  A  A  A  A  A  A
 21   0  0  0  0  0  0  0  0  0  0  0  0  0  0  0  0  0  0    =      A  A  A  A  A  A  A  A  A  A
 22   0  0  0  0  0  0  0  0  0  0  0  0  0  0  0  0  0  0    =      A  A  A  A  A  A  A  A  A  A
 23   0  0  0  0  0  0  0  0  0  0  0  0  0  0  0  0  0  0    =      A  A  A  A  A  A  A  A  A  A
```

TABLE 2-continued
FPLA B PROGRAM
TRANSCEIVER CONTROL (BYTES 3 and 4)

| | INPUTS | | | | | | | | | | | | | | | | | | | OUTPUTS | | | | | | | | | |
|---|---|---|---|---|---|---|---|---|---|---|---|---|---|---|---|---|---|---|---|---|---|---|---|---|---|---|---|---|---|
| | | | | | | | | | | | | | | | | | | | | H | H | L | L | L | L | L | L | L | L |
| TERM | I7 | I6 | I5 | I4 | I3 | I2 | I1 | I0 | B9 | B8 | B7 | B6 | B5 | B4 | B3 | B2 | B1 | B0 | | B9 | B8 | B7 | B6 | B5 | B4 | B3 | B2 | B1 | B0 |
| 24 | 0 | 0 | 0 | 0 | 0 | 0 | 0 | 0 | 0 | 0 | 0 | 0 | 0 | 0 | 0 | 0 | 0 | 0 | = | A | A | A | A | A | A | A | A | A | A |
| 25 | 0 | 0 | 0 | 0 | 0 | 0 | 0 | 0 | 0 | 0 | 0 | 0 | 0 | 0 | 0 | 0 | 0 | 0 | = | A | A | A | A | A | A | A | A | A | A |
| 26 | 0 | 0 | 0 | 0 | 0 | 0 | 0 | 0 | 0 | 0 | 0 | 0 | 0 | 0 | 0 | 0 | 0 | 0 | = | A | A | A | A | A | A | A | A | A | A |
| 27 | 0 | 0 | 0 | 0 | 0 | 0 | 0 | 0 | 0 | 0 | 0 | 0 | 0 | 0 | 0 | 0 | 0 | 0 | = | A | A | A | A | A | A | A | A | A | A |
| 28 | 0 | 0 | 0 | 0 | 0 | 0 | 0 | 0 | 0 | 0 | 0 | 0 | 0 | 0 | 0 | 0 | 0 | 0 | = | A | A | A | A | A | A | A | A | A | A |
| 29 | 0 | 0 | 0 | 0 | 0 | 0 | 0 | 0 | 0 | 0 | 0 | 0 | 0 | 0 | 0 | 0 | 0 | 0 | = | A | A | A | A | A | A | A | A | A | A |
| 30 | 0 | 0 | 0 | 0 | 0 | 0 | 0 | 0 | 0 | 0 | 0 | 0 | 0 | 0 | 0 | 0 | 0 | 0 | = | A | A | A | A | A | A | A | A | A | A |
| 31 | 0 | 0 | 0 | 0 | 0 | 0 | 0 | 0 | 0 | 0 | 0 | 0 | 0 | 0 | 0 | 0 | 0 | 0 | = | A | A | A | A | A | A | A | A | A | A |
| D9 | 0 | 0 | 0 | 0 | 0 | 0 | 0 | 0 | 0 | 0 | 0 | 0 | 0 | 0 | 0 | 0 | 0 | 0 | == | \| | \| | \| | \| | \| | \| | \| | \| | \| | \| |
| D8 | 0 | 0 | 0 | 0 | 0 | 0 | 0 | 0 | 0 | 0 | 0 | 0 | 0 | 0 | 0 | 0 | 0 | 0 | === | = | \| | \| | \| | \| | \| | \| | \| | \| | \| |
| D7 | — | — | — | — | — | — | — | — | — | — | — | — | — | — | — | — | — | — | === | = | = | \| | \| | \| | \| | \| | \| | \| | \| |
| D6 | — | — | — | — | — | — | — | — | — | — | — | — | — | — | — | — | — | — | === | = | = | = | \| | \| | \| | \| | \| | \| | \| |
| D5 | — | — | — | — | — | — | — | — | — | — | — | — | — | — | — | — | — | — | === | = | = | = | = | \| | \| | \| | \| | \| | \| |
| D4 | — | — | — | — | — | — | — | — | — | — | — | — | — | — | — | — | — | — | === | = | = | = | = | = | \| | \| | \| | \| | \| |
| D3 | — | — | — | — | — | — | — | — | — | — | — | — | — | — | — | — | — | — | === | = | = | = | = | = | = | \| | \| | \| | \| |
| D2 | — | — | — | — | — | — | — | — | — | — | — | — | — | — | — | — | — | — | === | = | = | = | = | = | = | = | \| | \| | \| |
| D1 | — | — | — | — | — | — | — | — | — | — | — | — | — | — | — | — | — | — | === | = | = | = | = | = | = | = | = | \| | \| |
| D0 | — | — | — | — | — | — | — | — | — | — | — | — | — | — | — | — | — | — | === | = | = | = | = | = | = | = | = | = | \| |

TABLE 3
FPLA C PROGRAM
RAM CONTROL (BYTES 0 and 1)

| | INPUTS | | | | | | | | | | | | | | | | | | | OUTPUTS | | | | | | | | | |
|---|---|---|---|---|---|---|---|---|---|---|---|---|---|---|---|---|---|---|---|---|---|---|---|---|---|---|---|---|---|
| | | | | | | | | | | | | | | | | | | | | H | H | H | H | H | H | L | L | L | L |
| TERM | I7 | I6 | I5 | I4 | I3 | I2 | I1 | I0 | B9 | B8 | B7 | B6 | B5 | B4 | B3 | B2 | B1 | B0 | | B9 | B8 | B7 | B6 | B5 | B4 | B3 | B2 | B1 | B0 |
| 0 | — | H | H | — | — | — | — | — | — | L | L | — | — | — | — | — | — | — | = | . | . | . | . | . | . | . | . | A | A |
| 1 | H | H | H | L | H | L | — | — | L | H | H | — | — | — | — | — | — | — | = | . | . | . | . | . | . | A | A | . | . |
| 2 | L | H | H | L | H | H | — | — | L | H | H | — | — | — | — | — | — | — | = | . | . | . | . | . | . | A | A | . | . |
| 3 | H | H | H | H | L | L | — | L | L | H | H | — | — | — | — | — | — | — | = | . | . | . | . | . | . | A | . | . | . |
| 4 | L | H | H | H | L | H | — | L | L | H | H | — | — | — | — | — | — | — | = | . | . | . | . | . | . | A | . | . | . |
| 5 | H | H | H | H | L | L | L | — | L | H | H | — | — | — | — | — | — | — | = | . | . | . | . | . | . | A | . | . | . |
| 6 | L | H | H | H | L | H | L | — | L | H | H | — | — | — | — | — | — | — | = | . | . | . | . | . | . | A | . | . | . |
| 7 | H | H | H | H | L | L | H | H | L | H | H | — | — | — | — | — | — | — | = | . | . | . | . | . | . | A | . | . | . |
| 8 | L | H | H | H | L | L | H | H | L | H | H | — | — | — | — | — | — | — | = | . | . | . | . | . | . | A | . | . | . |
| 9 | L | H | H | H | — | H | L | — | H | — | H | — | — | — | — | — | — | — | = | . | . | . | . | . | . | . | . | A | . |
| 10 | H | H | H | H | — | L | L | — | H | — | H | — | — | — | — | — | — | — | = | . | . | . | . | . | . | . | . | A | . |
| 11 | H | H | H | H | H | H | H | — | H | — | H | — | — | — | — | — | — | — | = | . | . | . | . | . | . | . | . | A | A |
| 12 | L | H | H | H | H | L | H | — | H | — | H | — | — | — | — | — | — | — | = | . | . | . | . | . | . | . | . | A | A |
| 13 | L | H | H | — | H | H | L | H | H | — | H | — | — | — | — | — | — | — | = | . | . | . | . | . | . | . | . | A | . |
| 14 | H | H | H | — | H | L | L | H | H | — | H | — | — | — | — | — | — | — | = | . | . | . | . | . | . | . | . | A | . |
| 15 | H | H | H | H | — | H | H | H | H | — | H | — | — | — | — | — | — | — | = | . | . | . | . | . | . | . | . | . | A |
| 16 | H | H | H | H | H | H | — | H | H | — | H | — | — | — | — | — | — | — | = | . | . | . | . | . | . | . | . | . | A |
| 17 | L | H | H | H | — | L | H | H | H | — | H | — | — | — | — | — | — | — | = | . | . | . | . | . | . | . | . | . | A |
| 18 | L | H | H | H | H | L | — | H | H | — | H | — | — | — | — | — | — | — | = | . | . | . | . | . | . | . | . | . | A |
| 19 | L | H | H | H | — | H | L | L | H | — | H | — | — | — | — | — | — | — | = | . | . | . | . | . | . | . | . | . | A |
| 20 | H | H | H | H | — | L | L | L | H | — | H | — | — | — | — | — | — | — | = | . | . | . | . | . | . | . | . | . | A |
| 21 | L | H | H | — | H | H | L | L | H | — | H | — | — | — | — | — | — | — | = | . | . | . | . | . | . | . | . | . | A |
| 22 | H | H | H | — | H | L | L | L | H | — | H | — | — | — | — | — | — | — | = | . | . | . | . | . | . | . | . | . | A |
| 23 | 0 | 0 | 0 | 0 | 0 | 0 | 0 | 0 | 0 | 0 | 0 | 0 | 0 | 0 | 0 | 0 | 0 | 0 | = | A | A | A | A | A | A | A | A | A | A |
| 24 | 0 | 0 | 0 | 0 | 0 | 0 | 0 | 0 | 0 | 0 | 0 | 0 | 0 | 0 | 0 | 0 | 0 | 0 | = | A | A | A | A | A | A | A | A | A | A |
| 25 | 0 | 0 | 0 | 0 | 0 | 0 | 0 | 0 | 0 | 0 | 0 | 0 | 0 | 0 | 0 | 0 | 0 | 0 | = | A | A | A | A | A | A | A | A | A | A |
| 26 | 0 | 0 | 0 | 0 | 0 | 0 | 0 | 0 | 0 | 0 | 0 | 0 | 0 | 0 | 0 | 0 | 0 | 0 | = | A | A | A | A | A | A | A | A | A | A |
| 27 | 0 | 0 | 0 | 0 | 0 | 0 | 0 | 0 | 0 | 0 | 0 | 0 | 0 | 0 | 0 | 0 | 0 | 0 | = | A | A | A | A | A | A | A | A | A | A |
| 28 | 0 | 0 | 0 | 0 | 0 | 0 | 0 | 0 | 0 | 0 | 0 | 0 | 0 | 0 | 0 | 0 | 0 | 0 | = | A | A | A | A | A | A | A | A | A | A |
| 29 | 0 | 0 | 0 | 0 | 0 | 0 | 0 | 0 | 0 | 0 | 0 | 0 | 0 | 0 | 0 | 0 | 0 | 0 | = | A | A | A | A | A | A | A | A | A | A |
| 30 | 0 | 0 | 0 | 0 | 0 | 0 | 0 | 0 | 0 | 0 | 0 | 0 | 0 | 0 | 0 | 0 | 0 | 0 | = | A | A | A | A | A | A | A | A | A | A |
| 31 | 0 | 0 | 0 | 0 | 0 | 0 | 0 | 0 | 0 | 0 | 0 | 0 | 0 | 0 | 0 | 0 | 0 | 0 | = | A | A | A | A | A | A | A | A | A | A |
| D9 | 0 | 0 | 0 | 0 | 0 | 0 | 0 | 0 | 0 | 0 | 0 | 0 | 0 | 0 | 0 | 0 | 0 | 0 | == | \| | \| | \| | \| | \| | \| | \| | \| | \| | \| |
| D8 | 0 | 0 | 0 | 0 | 0 | 0 | 0 | 0 | 0 | 0 | 0 | 0 | 0 | 0 | 0 | 0 | 0 | 0 | === | = | \| | \| | \| | \| | \| | \| | \| | \| | \| |
| D7 | 0 | 0 | 0 | 0 | 0 | 0 | 0 | 0 | 0 | 0 | 0 | 0 | 0 | 0 | 0 | 0 | 0 | 0 | === | = | = | \| | \| | \| | \| | \| | \| | \| | \| |
| D6 | 0 | 0 | 0 | 0 | 0 | 0 | 0 | 0 | 0 | 0 | 0 | 0 | 0 | 0 | 0 | 0 | 0 | 0 | === | = | = | = | \| | \| | \| | \| | \| | \| | \| |
| D5 | 0 | 0 | 0 | 0 | 0 | 0 | 0 | 0 | 0 | 0 | 0 | 0 | 0 | 0 | 0 | 0 | 0 | 0 | === | = | = | = | = | \| | \| | \| | \| | \| | \| |
| D4 | 0 | 0 | 0 | 0 | 0 | 0 | 0 | 0 | 0 | 0 | 0 | 0 | 0 | 0 | 0 | 0 | 0 | 0 | === | = | = | = | = | = | \| | \| | \| | \| | \| |
| D3 | — | — | — | — | — | — | — | — | — | — | — | — | — | — | — | — | — | — | === | = | = | = | = | = | = | \| | \| | \| | \| |
| D2 | — | — | — | — | — | — | — | — | — | — | — | — | — | — | — | — | — | — | === | = | = | = | = | = | = | = | \| | \| | \| |
| D1 | — | — | — | — | — | — | — | — | — | — | — | — | — | — | — | — | — | — | === | = | = | = | = | = | = | = | = | \| | \| |
| D0 | — | — | — | — | — | — | — | — | — | — | — | — | — | — | — | — | — | — | === | = | = | = | = | = | = | = | = | = | \| |

TABLE 4
FPLA D PROGRAM
RAM CONTROL (BYTES 2 and 3)

| | INPUTS | | | | | | | | | | | | | | | | | | OUTPUTS | | | | | | | | | |
|---|---|---|---|---|---|---|---|---|---|---|---|---|---|---|---|---|---|---|---|---|---|---|---|---|---|---|---|---|
| | | | | | | | | | | | | | | | | | | | H | H | H | H | H | L | L | L | L | L |
| TERM | I7 | I6 | I5 | I4 | I3 | I2 | I1 | I0 | B9 | B8 | B7 | B6 | B5 | B4 | B3 | B2 | B1 | B0 | | B9 | B8 | B7 | B6 | B5 | B4 | B3 | B2 | B1 | B0 |
| 0 | — | H | H | — | — | — | — | — | L | L | — | — | — | — | — | — | — | — | = | . | . | . | . | . | . | . | . | A | A |
| 1 | H | H | H | H | L | L | — | L | L | H | H | — | — | — | — | — | — | — | = | . | . | . | . | . | . | . | A | . | . |
| 2 | L | H | H | H | L | H | — | L | L | H | H | — | — | — | — | — | — | — | = | . | . | . | . | . | . | . | A | . | . |
| 3 | H | H | H | H | L | L | L | — | L | H | H | — | — | — | — | — | — | — | = | . | . | . | . | . | . | . | A | . | . |
| 4 | L | H | H | H | L | H | L | — | L | H | H | — | — | — | — | — | — | — | = | . | . | . | . | . | . | . | A | . | . |
| 5 | H | H | H | H | L | H | H | H | L | H | H | — | — | — | — | — | — | — | = | . | . | . | . | . | . | . | A | . | . |
| 6 | L | H | H | H | L | L | H | H | L | H | H | — | — | — | — | — | — | — | = | . | . | . | . | . | . | . | A | . | . |
| 7 | L | H | H | H | — | H | H | — | H | — | H | — | — | — | — | — | — | — | = | . | . | . | . | . | . | . | . | A | . |
| 8 | H | H | H | H | — | L | L | H | H | — | H | — | — | — | — | — | — | — | = | . | . | . | . | . | . | . | . | A | . |
| 9 | L | H | H | H | H | H | — | — | H | — | H | — | — | — | — | — | — | — | = | . | . | . | . | . | . | . | . | A | . |
| 10 | H | H | H | H | H | L | — | — | H | — | H | — | — | — | — | — | — | — | = | . | . | . | . | . | . | . | . | A | . |
| 11 | L | H | H | — | H | H | H | H | H | — | H | — | — | — | — | — | — | — | = | . | . | . | . | . | . | . | . | A | . |
| 12 | H | H | H | — | H | L | H | H | H | — | H | — | — | — | — | — | — | — | = | . | . | . | . | . | . | . | . | A | . |
| 13 | L | H | H | — | H | H | L | H | H | — | H | — | — | — | — | — | — | — | = | . | . | . | . | . | . | . | . | A | . |
| 14 | H | H | H | H | — | L | H | L | H | — | H | — | — | — | — | — | — | — | = | . | . | . | . | . | . | . | . | . | A |
| 15 | L | H | H | — | H | L | H | H | H | — | H | — | — | — | — | — | — | — | = | . | . | . | . | . | . | . | . | . | A |
| 16 | H | H | H | — | L | L | H | H | H | — | H | — | — | — | — | — | — | — | = | . | . | . | . | . | . | . | . | . | A |
| 17 | L | H | H | H | H | H | L | — | H | — | H | — | — | — | — | — | — | — | = | . | . | . | . | . | . | . | . | . | A |
| 18 | H | H | H | H | H | L | L | — | H | — | H | — | — | — | — | — | — | — | = | . | . | . | . | . | . | . | . | . | A |
| 19 | L | H | H | — | H | H | L | H | H | — | H | — | — | — | — | — | — | — | = | . | . | . | . | . | . | . | . | . | A |
| 20 | H | H | H | — | H | L | H | L | H | — | H | — | — | — | — | — | — | — | = | . | . | . | . | . | . | . | . | . | A |
| 21 | H | H | H | H | H | H | H | H | H | — | H | — | — | — | — | — | — | — | = | . | . | . | . | . | . | . | . | . | A |
| 22 | L | H | H | H | L | H | H | H | — | H | — | — | — | — | — | — | — | — | = | . | . | . | . | . | . | . | . | . | A |
| 23 | 0 | 0 | 0 | 0 | 0 | 0 | 0 | 0 | 0 | 0 | 0 | 0 | 0 | 0 | 0 | 0 | 0 | 0 | = | A | A | A | A | A | A | A | A | A | A |
| 24 | 0 | 0 | 0 | 0 | 0 | 0 | 0 | 0 | 0 | 0 | 0 | 0 | 0 | 0 | 0 | 0 | 0 | 0 | = | A | A | A | A | A | A | A | A | A | A |
| 25 | 0 | 0 | 0 | 0 | 0 | 0 | 0 | 0 | 0 | 0 | 0 | 0 | 0 | 0 | 0 | 0 | 0 | 0 | = | A | A | A | A | A | A | A | A | A | A |
| 26 | 0 | 0 | 0 | 0 | 0 | 0 | 0 | 0 | 0 | 0 | 0 | 0 | 0 | 0 | 0 | 0 | 0 | 0 | = | A | A | A | A | A | A | A | A | A | A |
| 27 | 0 | 0 | 0 | 0 | 0 | 0 | 0 | 0 | 0 | 0 | 0 | 0 | 0 | 0 | 0 | 0 | 0 | 0 | = | A | A | A | A | A | A | A | A | A | A |
| 28 | 0 | 0 | 0 | 0 | 0 | 0 | 0 | 0 | 0 | 0 | 0 | 0 | 0 | 0 | 0 | 0 | 0 | 0 | = | A | A | A | A | A | A | A | A | A | A |
| 29 | 0 | 0 | 0 | 0 | 0 | 0 | 0 | 0 | 0 | 0 | 0 | 0 | 0 | 0 | 0 | 0 | 0 | 0 | = | A | A | A | A | A | A | A | A | A | A |
| 30 | 0 | 0 | 0 | 0 | 0 | 0 | 0 | 0 | 0 | 0 | 0 | 0 | 0 | 0 | 0 | 0 | 0 | 0 | = | A | A | A | A | A | A | A | A | A | A |
| 31 | 0 | 0 | 0 | 0 | 0 | 0 | 0 | 0 | 0 | 0 | 0 | 0 | 0 | 0 | 0 | 0 | 0 | 0 | = | A | A | A | A | A | A | A | A | A | A |
| D9 | 0 | 0 | 0 | 0 | 0 | 0 | 0 | 0 | 0 | 0 | 0 | 0 | 0 | 0 | 0 | 0 | 0 | 0 | = | = | | | | | | | | | |
| D8 | 0 | 0 | 0 | 0 | 0 | 0 | 0 | 0 | 0 | 0 | 0 | 0 | 0 | 0 | 0 | 0 | 0 | 0 | = | = | = | | | | | | | | |
| D7 | 0 | 0 | 0 | 0 | 0 | 0 | 0 | 0 | 0 | 0 | 0 | 0 | 0 | 0 | 0 | 0 | 0 | 0 | = | = | = | = | | | | | | | |
| D6 | 0 | 0 | 0 | 0 | 0 | 0 | 0 | 0 | 0 | 0 | 0 | 0 | 0 | 0 | 0 | 0 | 0 | 0 | = | = | = | = | = | | | | | | |
| D5 | 0 | 0 | 0 | 0 | 0 | 0 | 0 | 0 | 0 | 0 | 0 | 0 | 0 | 0 | 0 | 0 | 0 | 0 | = | = | = | = | = | = | | | | | |
| D4 | 0 | 0 | 0 | 0 | 0 | 0 | 0 | 0 | 0 | 0 | 0 | 0 | 0 | 0 | 0 | 0 | 0 | 0 | = | = | = | = | = | = | = | | | | |
| D3 | 0 | 0 | 0 | 0 | 0 | 0 | 0 | 0 | 0 | 0 | 0 | 0 | 0 | 0 | 0 | 0 | 0 | 0 | = | = | = | = | = | = | = | = | | | |
| D2 | — | — | — | — | — | — | — | — | — | — | — | — | — | — | — | — | — | — | = | = | = | = | = | = | = | = | = | | |
| D1 | — | — | — | — | — | — | — | — | — | — | — | — | — | — | — | — | — | — | = | = | = | = | = | = | = | = | = | = | |
| D0 | — | — | — | — | — | — | — | — | — | — | — | — | — | — | — | — | — | — | = | = | = | = | = | = | = | = | = | = | = |

TABLE 6
DATA MULTIPLEXING DURING READ CYCLE

| Sign Extend | Number of Bytes | A2 | A1 | A0 | ADDRESS N+2 (EVEN MEMORY) | | | | | ADDRESS N+1 (ODD MEMORY) | | | | | ADDRESS N (EVEN MEMORY) | | | | |
|---|---|---|---|---|---|---|---|---|---|---|---|---|---|---|---|---|---|---|---|
| | | | | | MSB | B3 | B2 | B1 | B0 LSB | MSB | B3 | B2 | B1 | B0 LSB | MSB | B3 | B2 | B1 | B0 LSB |
| NO | 1 | 0 | 0 | 0 | | | | | | | | | | | | 0 | 0 | 0 | M0 |
| | | 0 | 0 | 1 | | | | | | | | | | | | 0 | 0 | 0 | M1 |
| | | 0 | 1 | 0 | | | | | | | | | | | | 0 | 0 | 0 | M2 |
| | | 0 | 1 | 1 | | | | | | | | | | | | 0 | 0 | 0 | M3 |
| | | 1 | 0 | 0 | | | | | | | 0 | 0 | 0 | M4 | | | | | |
| | | 1 | 0 | 1 | | | | | | | 0 | 0 | 0 | M5 | | | | | |
| | | 1 | 1 | 0 | | | | | | | 0 | 0 | 0 | M6 | | | | | |
| | | 1 | 1 | 1 | | | | | | | 0 | 0 | 0 | M7 | | | | | |
| YES | 1 | 0 | 0 | 0 | | | | | | | | | | | | S | S | S | M0 |
| | | 0 | 0 | 1 | | | | | | | | | | | | S | S | S | M1 |
| | | 0 | 1 | 0 | | | | | | | | | | | | S | S | S | M2 |
| | | 0 | 1 | 1 | | | | | | | | | | | | S | S | S | M3 |
| | | 1 | 0 | 0 | | | | | | | S | S | S | M4 | | | | | |
| | | 1 | 0 | 1 | | | | | | | S | S | S | M5 | | | | | |
| | | 1 | 1 | 0 | | | | | | | S | S | S | M6 | | | | | |
| | | 1 | 1 | 1 | | | | | | | S | S | S | M7 | | | | | |
| NO | 2 | 0 | 0 | 0 | | | | | | | | | | | | 0 | 0 | M1 | M0 |
| | | 0 | 0 | 1 | | | | | | | | | | | | 0 | 0 | M3 | M2 |
| | | 0 | 1 | 0 | | | | | | | | | | | | 0 | 0 | M3 | M2 |
| | | 0 | 1 | 1 | | | | | | | 0 | 0 | M4 | — | | — | — | — | M3 |
| | | 1 | 0 | 0 | | | | | | | 0 | 0 | M5 | M4 | | | | | |
| | | 1 | 0 | 1 | | | | | | | 0 | 0 | M6 | M5 | | | | | |
| | | 1 | 1 | 0 | | | | | | | 0 | 0 | M7 | M6 | | | | | |
| | | 1 | 1 | 1 | 0 | 0 | M0 | — | | — | — | — | M7 | | | | | | |
| YES | 2 | 0 | 0 | 0 | | | | | | | | | | | | S | S | M1 | M0 |

TABLE 6-continued

| Sign Extend | Number of Bytes | A2 | A1 | A0 | ADDRESS N+2 (EVEN MEMORY) MSB | B3 | B2 | B1 | B0 LSB | ADDRESS N+1 (ODD MEMORY) MSB | B3 | B2 | B1 | B0 LSB | ADDRESS N (EVEN MEMORY) MSB | B3 | B2 | B1 | B0 LSB |
|---|---|---|---|---|---|---|---|---|---|---|---|---|---|---|---|---|---|---|---|
| | | 0 | 0 | 1 | | | | | | | | | | | | S | S | M2 | M1 |
| | | 0 | 1 | 0 | | | | | | | | | | | | S | S | M3 | M2 |
| | | 0 | 1 | 1 | | | | | | | S | S | M4 | — | | — | — | — | M3 |
| | | 1 | 0 | 0 | | | | | | | S | S | M5 | M4 | | | | | |
| | | 1 | 0 | 1 | | | | | | | S | S | M6 | M5 | | | | | |
| | | 1 | 1 | 0 | | | | | | | S | S | M7 | M6 | | | | | |
| | | 1 | 1 | 1 | | S | S | M0 | — | | — | — | — | M7 | | | | | |
| DON'T CARE | 4 | 0 | 0 | 0 | | | | | | | | | | | | M3 | M2 | M1 | M0 |
| | | 0 | 0 | 1 | | | | | | | M4 | — | — | — | | — | M3 | M2 | M1 |
| | | 0 | 1 | 0 | | | | | | | M5 | M4 | — | — | | — | — | M3 | M2 |
| | | 0 | 1 | 1 | | | | | | | M6 | M5 | M4 | — | | — | — | — | M3 |
| | | 1 | 0 | 0 | | | | | | | M7 | M6 | M5 | M4 | | | | | |
| | | 1 | 0 | 1 | | M0 | — | — | — | | — | M7 | M6 | M5 | | | | | |
| | | 1 | 1 | 0 | | M1 | M0 | — | — | | — | — | M7 | M6 | | | | | |
| | | 1 | 1 | 1 | | M2 | M1 | M0 | — | | — | — | — | M7 | | | | | |

NOTE:
S refers to the sign of the most significant bit of the most significant accessed byte. M0 through M7 refers to memory bytes 0 through 7. B0 through B3 refer to system bus bytes 0 through 3.

TABLE 7

| Number of Bytes | A2 | A1 | A0 | ADDRESS N+2 (EVEN MEMORY) MSB | M3 | M2 | M1 | M0 LSB | ADDRESS N+1 (ODD MEMORY) MSB | M7 | M6 | M5 | M4 LSB | ADDRESS N (EVEN MEMORY) MSB | M3 | M2 | M1 | M0 LSB |
|---|---|---|---|---|---|---|---|---|---|---|---|---|---|---|---|---|---|---|
| 1 | 0 | 0 | 0 | | | | | | | | | | | | — | — | — | B0 |
| | 0 | 0 | 1 | | | | | | | | | | | | — | — | B0 | — |
| | 0 | 1 | 0 | | | | | | | | | | | | — | B0 | — | — |
| | 0 | 1 | 1 | | | | | | | | | | | | B0 | — | — | — |
| | 1 | 0 | 0 | | | | | | | — | — | — | B0 | | | | | |
| | 1 | 0 | 1 | | | | | | | — | — | B0 | — | | | | | |
| | 1 | 1 | 0 | | | | | | | — | B0 | — | — | | | | | |
| | 1 | 1 | 1 | | | | | | | B0 | — | — | — | | | | | |
| 2 | 0 | 0 | 0 | | | | | | | | | | | | — | — | B1 | B0 |
| | 0 | 0 | 1 | | | | | | | | | | | | — | B1 | B0 | — |
| | 0 | 1 | 0 | | | | | | | | | | | | B1 | B0 | — | — |
| | 0 | 1 | 1 | | | | | | | — | — | — | B1 | | B0 | — | — | — |
| | 1 | 0 | 0 | | | | | | | — | — | B1 | B0 | | | | | |
| | 1 | 0 | 1 | | | | | | | — | B1 | B0 | — | | | | | |
| | 1 | 1 | 0 | | | | | | | B1 | B0 | — | — | | | | | |
| | 1 | 1 | 1 | | — | — | — | B1 | | B0 | — | — | — | | | | | |
| 4 | 0 | 0 | 0 | | | | | | | | | | | | B3 | B2 | B1 | B0 |
| | 0 | 0 | 1 | | | | | | | — | — | — | B3 | | B2 | B1 | B0 | — |
| | 0 | 1 | 0 | | | | | | | — | — | B3 | B2 | | B1 | B0 | — | — |
| | 0 | 1 | 1 | | | | | | | — | B3 | B2 | B1 | | B0 | — | — | — |
| | 1 | 0 | 0 | | | | | | | B3 | B2 | B1 | B0 | | | | | |
| | 1 | 0 | 1 | | — | — | — | B3 | | B2 | B1 | B0 | — | | | | | |
| | 1 | 1 | 0 | | — | — | B3 | B2 | | B1 | B0 | — | — | | | | | |
| | 1 | 1 | 1 | | — | B3 | B2 | B1 | | B0 | — | — | — | | | | | |

NOTE:
M0 through M7 refer to memory bytes 0 through 7. B0 through B3 refer to system bus bytes 0 through 3.

What is claimed is:

1. In combination:
   system bus means for delivering digital bytes of information to a memory means and receiving digital bytes of information from said memory means;
   transceiver means for transferring at least one of a plurality of said digital bytes between said memory means and said system bus means;
   first byte bus means for transferring at least one of said bytes between said system bus and a first port of said transceiver means;
   second byte bus means for transferring at least one of said bytes between a second port of said transceiver means and said memory means;
   means for controlling writing and reading memory accesses starting at any byte location within said memory means; and
   means for controlling said transceiver means when transferring at least one of said bytes between said memory means and said system bus.

2. The combination as recited in claim 1 wherein:
   said memory means includes at least one even-address memory segment and at least one odd-address memory segment, said memory segments capable of being accessed simultaneously to provide memory access for a plurality of sequential bytes.

3. The combination as recited in claim 1 wherein:
   said transceiver means comprises a plurality of bidirectional transceiver arrays.

4. The combination as recited in claim 3 wherein:
   each of said bidirectional transceiver arrays further comprises a plurality of multiple bit bidirectional bus transceivers.

5. The combination as recited in claim 1 wherein:

said memory access controlling means further comprises means for writing and reading a plurality of bytes extending across said memory segment boundaries.

6. The combination as recited in claim 1 wherein:
said memory controlling means and said transceiver controlling means comprise a plurality of programmable logic arrays.

7. In combination:
system bus means for delivering digital bytes of information to a memory means and receiving digital bytes of information from said memory means;
transceiver means for transferring at least one of a plurality of said digital bytes between said memory means and said system bus means;
first byte bus means for transferring at least one of said bytes between said system bus and a first port of said transceiver means;
second byte bus means for transferring at least one of said bytes between a second port of said transceiver means and said memory means;
means for controlling writing and reading memory accesses starting at any byte location within said memory means;
means for controlling said transceiver means when transferring at least one of said bytes between said memory means and said system bus;
means for performing right-justified zero-extension when transferring at least one of said bytes during a read memory cycle; and
means for performing right-justified sign-extension when transferring at least one of said bytes during a read memory cycle.

8. The combination as recited in claim 7 wherein:
said memory means includes at least one even-address memory segment and at least one odd-address memory segment, said memory segments capable of being accessed simultaneously to provide memory access for a plurality of sequential bytes.

9. The combination as recited in claim 7 wherein:
said transceiver means comprises a plurality of bidirectional transceiver arrays.

10. The combination as recited in claim 9 wherein:
each of said bidirectional transceiver arrays further comprises a plurality of multiple bit bidirectional bus transceivers.

11. The combination as recited in claim 7 wherein:
said memory access controlling means further comprises means for writing and reading a plurality of bytes extending across said memory segment boundaries.

12. The combination as recited in claim 7 wherein:
said memory controlling means and said transceiver controlling means comprise a plurality of programmable logic arrays.

13. The combination as recited in claim 8 wherein:
each of said memory segments comprises identical sets of a plurality of programmable logic arrays.

14. The combination as recited in claim 7 wherein:
said sign-extension means comprises means for examining a most significant bit of a most significant byte for said sign extension determination.

15. In combination:
memory means for storing a plurality of digital bytes of information, said memory means comprising at least one even-address memory segment and at least one odd-address memory segment;
byte aligner means for accessing a byte of information at any one of a plurality of byte locations in said memory means within one memory cycle and for accessing a plurality of sequential bytes starting at any byte location in said memory means within one memory cycle; and
said byte aligner means comprising a system bus means for delivering said digital bytes to said memory means and receiving said digital bytes from said memory means.

16. The combination as recited in claim 15 wherein:
said even-address memory segment and said odd-address memory segment comprise means for being accessed simultaneously in one memory cycle time to provide memory access for a plurality of sequential bytes.

17. The combination as recited in claim 15 wherein:
each of said memory segments comprises byte aligner means interconnected by said system bus.

18. The combination as recited in claim 15 wherein:
said memory means accesses comprise read memory cycles and write memory cycles.

19. The combination as recited in claim 15 wherein:
said byte aligner means comprises a plurality of bidirectional transceiver arrays.

20. The combination as recited in claim 19 wherein:
each of said bidirectional transceiver arrays further comprise a plurality of multiple bit bidirectional bus transceivers.

21. The combination as recited in claim 15 wherein:
said byte aligner means further comprises a plurality of programmed logic arrays.

22. The combination as recited in claim 21 wherein:
said programmed logic arrays comprise means for generating control signals for said memory means and a bidirectional transceiver array.

23. The combination as recited in claim 15 wherein:
said byte aligner means further comprises means for performing right-justified zero-extension when transferring at least one of said bytes to said system bus from said memory means during a read memory cycle, and means for performing right-justified sign-extension when transferring at least one of said bytes to said system bus from said memory means during a read memory cycle.

24. In combination:
memory means for storing a plurality of digital bytes of information, said memory means comprising at least one even-address memory segment and at least one odd-address memory segment;
system bus means for delivering digital bytes of information to said memory means and receiving digital bytes of information from said memory means;
first byte bus means for transferring at least one of said bytes between said system bus and a first port of said transceiver means;
second byte bus means for transferring at least one of said bytes between a second port of said transceiver means and said memory means;
means for controlling writing and reading memory accesses starting at any byte location within said memory means; and
means for controlling said transceiver means when transferring at least one of said bytes between said memory means and said system bus.

25. The combination as recited in claim 24 wherein:
said even-address memory segment and said odd-address memory segment comprise means for being accessed simultaneously to provide memory access for a plurality of sequential bytes.

26. The combination as recited in claim 24 wherein: said transceiver means comprises a plurality of bidirectional transceiver arrays.

27. The combination as recited in claim 26 wherein: each of said bidirectional transceiver arrays further comprises a plurality of multiple bit bidirectional bus transceivers.

28. The combination as recited in claim 24 wherein: said memory access controlling means further comprises means for writing and reading a plurality of bytes extending across said memory segment boundaries.

29. The combination as recited in claim 24 wherein: said memory controlling means and said transceiver controlling means comprise a plurality of programmable logic arrays.

30. In combination:
memory means for storing a plurality of digital bytes of information, said memory means comprising at least one even-address memory segment and at least one odd-address memory segment;
system bus means for delivering digital bytes of information to said memory means and receiving digital bytes of information from said memory means;
transceiver means for transferring at least one of a plurality of said digital bytes between said memory means and said system bus means;
first byte bus means for transferring at least one of said bytes between said system bus and a first port of said transceiver means;
second byte bus means for transferring at least one of said bytes between a second port of said transceiver means and said memory means;
means for controlling writing and reading memory accesses starting at any byte location within said memory means;
means for controlling said transceiver means when transferring at least one of said bytes between said memory means and said system bus;
means for performing right-justified zero-extension when transferring at least one of said bytes during a read memory cycle; and
means for performing right-justified sign-extension when transferring at least one of said bytes during a read memory cycle.

31. The combination as recited in claim 30 wherein: said even-address memory segment and said odd-address memory segment comprise means for being accessed simultaneously to provide memory access for a plurality of sequential bytes.

32. The combination as recited in claim 30 wherein: said transceiver means comprises a plurality of bidirectional transceiver arrays.

33. The combination as recited in claim 32 wherein: each of said bidirectional transceiver arrays further comprises a plurality of multiple bit bidirectional bus transceivers.

34. The combination as recited in claim 30 wherein: said memory access controlling means further comprises means for writing and reading a plurality of bytes extending across said memory segment boundaries.

35. The combination as recited in claim 30 wherein: said memory controlling means and said transceiver controlling means comprise a plurality of programmable logic arrays.

36. The combination as recited in claims 31 wherein: each of said memory segments comprises identical sets of a plurality of programmable logic arrays.

37. The combination as recited in claim 30 wherein: said sign-extension means comprises means for examining a most significant bit of a most significant byte for said sign extension determination.

38. In combination:
a bidirectional transceiver array comprising a plurality of multiple bit bidirectional transceivers, each transceiver having the capability of transferring at least one byte of digital information;
a first bus comprising a plurality of bytes, each of said bus bytes connecting a byte of a system bus to a first port of a first grouping of said transceivers in parallel with each other;
said system bus connected to a plurality of said first bus for delivering and receiving digital information comprising a plurality of bytes to and from an even-address memory segment and an odd-address memory segment;
a second bus comprising a plurality of bytes, each of said bus bytes connecting a byte of a memory array of said memory segments to a second port of a second grouping of said transceivers in parallel with each other;
memory control logic, responsive to memory addressing signals, connected to said memory array for controlling writing and reading accesses on byte boundaries within each of said memory segments and across said memory segment boundaries; and
transceiver control logic, responsive to memory addressing signals, connected to said transceiver array for controlling the transfer of at least one byte of said plurality of bytes of information between said memory array and said system bus.

39. The combination as recited in claim 38 wherein: said even-address memory segment and said odd-address memory segment comprise means for being accessed simultaneous to provide memory access for a plurality of sequential bytes.

40. The combination as recited in claim 38 wherein: said first grouping of said transceivers provide for a byte of said system bus to be transferred to and from any byte position in said memory array.

41. The combination as recited in claim 38 wherein: said second grouping of said transceivers provide for a byte of said memory array to be transferred to and from any byte position of said system bus.

42. The combination as recited in claim 38 wherein: said memory control logic and said transceiver control logic comprise a plurality of programmable logic arrays.

43. In combination:
a bidirectional transceiver array comprising a plurality of multiple bit bidirectional transceivers, each transceiver having the capability of transferring at least one byte of digital information;
a first bus comprising a plurality of bytes, each of said bus bytes connecting a byte of a system bus to a first port of a first grouping of said transceivers in parallel with each other;
said system bus connected to a plurality of said first bus for delivering and receiving digital information comprising a plurality of bytes to and from an even-address memory segment and an odd-address memory segment;

a second bus comprising a plurality of bytes, each of said bus bytes connecting a byte of a memory array of said memory segments to a second port of a second grouping of said transceivers in parallel with each other;

memory control logic, responsive to memory addressing signals, connected to said memory array for controlling writing and reading accesses on byte boundaries within each of said memory segments and across said memory segment boundaries;

transceiver control logic, responsive to memory addressing signals, connected to said transceiver array for controlling the transfer of at least one byte of said plurality of bytes of information between said memory array and said system bus;

means coupled to said memory control logic for performing right-justified zero-extension when transferring at least one of said bytes during a read memory cycle; and means coupled to said memory control logic for performing right-justified sign-extension when transferring at least one of said bytes during a read memory cycle.

44. The combination as recited in claim 43 wherein:
said even-address memory segment and said odd-address memory segment comprise means for being accessed simultaneous to provide memory access for a plurality of sequential bytes.

45. The combination as recited in claim 43 wherein:
said first grouping of said transceivers provide for a byte of said system bus to be transferred to and from any byte in said memory array.

46. The combination as recited in claim 43 wherein:
said second grouping of said transceivers provide for a byte of said memory array to be transferred to and from any byte position of said system bus.

47. The combination as recited in claim 43 wherein:
said memory control logic and said transceiver control logic comprise a plurality of programmable logic arrays.

48. The combination as recited in claim 43 wherein:
said sign-extension means comprises means for examining a most significant bit of a most significant byte for said sign extension determination.

49. The method of accessing a memory means having byte addressing capability comprising the steps of:
providing digital bytes of information to a system bus;
transferring said bytes on a first byte bus means between said system bus and a bidirectional transceiver means;
performing byte alignment with said transceiver means;
transferring said bytes on a second byte bus means between said bidirectional transceiver means and said memory means;
controlling writing and reading cycles of said memory means with programmed logic array means; and
controlling said bidirectional transceiver means with said programmed logic array.

50. The method as recited in claim 49 wherein:
said memory means comprises at least one even-address memory array and at least one odd-address memory array, said memory arrays capable of being accessed simultaneously to provide memory access for a plurality of sequential bytes.

51. The method as recited in claim 50 wherein:
said step of controlling the writing and reading cycles for said digital bytes comprises means for starting at any byte location within said memory means and extending across said memory array boundaries.

52. The method as recited in claim 49 wherein:
said bidirectional transceiver means comprises a plurality of bidirectional transceiver arrays, each of said arrays further comprises a plurality of multiple bit bidirectional bus transceivers.

53. The method of accessing a memory means having byte addressing capability comprising the steps of:
providing digital bytes of information to a system bus;
transferring said bytes on a first byte bus means between said system bus and a bidirectional transceiver means;
performing byte alignment with said transceiver means;
transferring said bytes on a second byte bus means between said bidirectional transceiver means and said memory means;
controlling writing and reading cycles of said memory means with programmed logic array means;
controlling said bidirectional transceiver means performing byte alignment with said programmed logic array means;
performing right-justified zero-extension when transferring at least one of said bytes to said system bus during a read memory cycle; and
performing right-justified sign-extension when transferring at least one of said bytes to said system bus during a read memory cycle.

54. The method as recited in claim 53 wherein:
said memory means comprises at least one even-address memory array and at least one odd-address memory array, said memory arrays capable of being accessed simultaneously to provide memory access for a plurality of sequential bytes.

55. The method as recited in claim 54 wherein:
said step of controlling the writing and reading cycles for said digital bytes comprises means for starting at any byte location within said memory means and extending across said memory array boundaries.

56. The method as recited in claim 53 wherein:
said bidirectional transceiver means comprises a plurality of bidirectional transceiver arrays, each of said arrays further comprises a plurality of multiple bit bidirectional bus transceivers.

57. The method as recited in claim 53 wherein:
said steps of performing right-justified sign-extension comprises means for examining a most significant bit of a most significant byte for sign extension determination.

* * * * *

UNITED STATES PATENT OFFICE
CERTIFICATE OF CORRECTION

Patent No. 4,507,731　　　　　　　　Dated March 26, 1985

Inventor(s) Brian D. Morrison

It is certified that error appears in the above-identified patent and that said Letters Patent are hereby corrected as shown below:

In the Abstract: 2nd to the last line: Change "cycles" to --cycle--.

In the Specification:

Column 2, Line 58: Change "oddaddress" to --odd address--.
Column 5, Line 16: Change "TESTENsignal" to --TESTEN-signal--.
Column 14, Table 6: In the 10th item in the column labled "Address N (Even Memory)" and in line with Number of Bytes = 2 and A2 A1 A0 = 001, Change: "M3" to --M2-- and "M2" to --M1--.

Signed and Sealed this

Fourth Day of March 1986

[SEAL]

Attest:

DONALD J. QUIGG

Attesting Officer　　Commissioner of Patents and Trademarks